US010679099B2

(12) United States Patent
Kehl et al.

(10) Patent No.: US 10,679,099 B2
(45) Date of Patent: Jun. 9, 2020

(54) METHOD AND APPARATUS FOR A MANIFOLD VIEW OF SPACE

(71) Applicant: TOYOTA RESEARCH INSTITUTE, INC., Los Altos, CA (US)

(72) Inventors: Wadim Kehl, San Francisco, CA (US); German Ros Sanchez, Mountain View, CA (US)

(73) Assignee: TOYTA RESEARCH INSTITUTE, INC., Los Altos, CA (US)

( * ) Notice: Subject to any disclaimer, the term of this patent is extended or adjusted under 35 U.S.C. 154(b) by 134 days.

(21) Appl. No.: 15/974,069

(22) Filed: May 8, 2018

(65) Prior Publication Data

US 2019/0347515 A1 Nov. 14, 2019

(51) Int. Cl.
| | | |
|---|---|---|
| *G06K 9/00* | (2006.01) |
| *G06K 9/62* | (2006.01) |
| *G06N 3/04* | (2006.01) |
| *G06N 3/08* | (2006.01) |
| *G08G 1/16* | (2006.01) |

(52) U.S. Cl.
CPC ......... *G06K 9/6218* (2013.01); *G06K 9/6262* (2013.01); *G06K 9/6276* (2013.01); *G06N 3/04* (2013.01); *G06N 3/08* (2013.01); *G08G 1/167* (2013.01)

(58) Field of Classification Search
None
See application file for complete search history.

(56) References Cited

U.S. PATENT DOCUMENTS

| | | |
|---|---|---|
| 8,958,641 B2 | 2/2015 | Yagi et al. |
| 9,311,567 B2 | 4/2016 | Lee et al. |
| 9,805,264 B2 | 10/2017 | Kuznetsova et al. |
| 2010/0061609 A1 | 3/2010 | Shinagawa et al. |
| 2011/0052068 A1* | 3/2011 | Cobb ................. G06K 9/00771 382/190 |

(Continued)

FOREIGN PATENT DOCUMENTS

EP 3048563 A1 7/2016

OTHER PUBLICATIONS

"Visual learning and recognition of 3-D objects from appearance," Murase, et al., International Journal of Computer Vision 14.1 (1995): 5-24.

(Continued)

*Primary Examiner* — Suhail Khan
(74) *Attorney, Agent, or Firm* — Seyfarth Shaw LLP

(57) ABSTRACT

An autonomous vehicle vision system for estimating a category of a detected object in an object pose unknown to the system includes a neural network to apply a mapping process to a region of interest in an image including the detected object in the object pose to obtain a point in a 3D manifold space. The system includes an object detector to estimate the category of the detected object in the object pose in the region of interest based on a relationship between the point representing the detected object in the object pose and a plurality of separate object clusters in the 3D manifold space. The system further includes a planner to select an improved route based on a predicted behavior of the category of the detected object in the object pose. The system also includes a controller to control operation of an autonomous vehicle according to the improved route.

18 Claims, 7 Drawing Sheets

(56) References Cited

U.S. PATENT DOCUMENTS

2013/0297539 A1 11/2013 Piekniewski et al.
2019/0205659 A1* 7/2019 Cuban ................ G06K 9/00718

OTHER PUBLICATIONS

"Learning descriptors for object recognition and 3d pose estimation," 2. Paul Wohlhart, et al., Proceedings of the IEEE Conference on Computer Vision and Pattern Recognition, 2015.

"Manifold learning with applications to object recognition," David R. Thompson, https://people.eecs.berkeley.edu/-efros/courses/AP06/presentations/ThompsonDimensionalityReduction.pdf, May 1, 2006.

"The Manifold Tangent Classifier," Rifai et al., Advances in Neural Information Processing Systems, 2011.

"Manifold learning and applications in recognition." Intelligent multimedia processing with soft computing, 5. Junping Zhang, et al., Springer, Berlin, Heidelberg, 2005. 281-300.

"Joint Object and Pose Recognition Using Homeomorphic Manifold Analysis," Zhang, Haopeng, et al., AAAI, vol. 2, 2013.

"Learning local feature descriptors with triplets and shallow convolutional neural networks," Vassileios Balntas, et al., BMVC, vol. 1, No. 2, 2016.

"Domain separation networks," Konstantinos Bousmalis, et al., Advances in Neural Information Processing Systems, 2016.

"Self-restraint object recognition by model based CNN learning," Yida Wang, et. al., Image Processing (ICIP), 2016 IEEE International Conference on. IEEE, 2016.

"Compact descriptors for sketch-based image retrieval using a triplet loss convolutional neural network," T. Bui, et al., Computer Vision and Image Understanding 164 (2017): 27-37.

"Smart Mining for Deep Metric Learning," Vijay BG Kumar, et al., arXiv preprint arXiv:1704.01285 (2017).

"YOLO9000: better, faster, stronger," Joseph Redmon, et. al., arXiv preprint 1612 (2016).

* cited by examiner

METHOD AND APPARATUS FOR A MANIFOLD VIEW OF SPACE

BACKGROUND

Field

Certain aspects of the present disclosure generally relate to machine learning and, more particularly, to a method and apparatus for a manifold view of space.

Background

Although scientists have spent decades studying the human visual system, a solution for realizing equivalent computer vision remains elusive. Realization of computer vision is a goal for enabling truly autonomous vehicles. Computer vision is distinct from the field of digital image processing due to the desire to recover a three-dimensional (3D) structure of the world from images and using the 3D structure for fully understanding a scene. That is, computer vision strives to provide a 3D view of a surrounding environment, as performed by the human visual system.

Autonomous vehicles rely on computer vision for analyzing an area of interest in an image. These autonomous vehicles may rely on a trained convolutional neural network (CNN) to identify objects within an area of interest in an image. For example, a CNN may be trained to identify and track objects captured by one or more sensors, such as light detection and ranging (LIDAR) sensors, sonar sensors, red-green-blue (RGB) cameras, and the like. The sensors may be coupled to, or in communication with, a device, such as an autonomous vehicle. Object detection applications may include route planning based on detected objects.

While identifying known objects in 3D images for which the CNN is trained is routine, identifying unknown objects for which the CNN is untrained is problematic. In addition, although the CNN may be trained to recognize an object, the object may appear in a pose for which the CNN is untrained. Failure to identify a known object captured in an unknown pose may prohibit the vehicle from identifying the object and cause malfunctioning.

There is a current and urgent need for a computer vision system that can address many of these drawbacks.

SUMMARY

A method for estimating a category of a detected object in an object pose unknown to an autonomous vehicle vision system is described. The method includes applying a mapping process to a region of interest in an image including the detected object in the object pose to obtain a point in a 3D manifold space. The method also includes estimating the category of the detected object in the object pose in the region of interest based on a relationship between the point representing the detected object in the object pose and a plurality of separate object clusters in the 3D manifold space. The method further includes supplying the category of the detected object in the object pose to a planner of the autonomous vehicle vision system. The method also includes controlling operation of an autonomous vehicle according to an improved route selected by the planner based on a predicted behavior of the detected object in the object pose.

A non-transitory computer-readable medium having program code recorded thereon for estimating a category of a detected object in an object pose unknown to an autonomous vehicle vision system is described. The program code is executed by a processor and includes program code to apply a mapping process to a region of interest in an image including the detected object in the object pose to obtain a point in a 3D manifold space. The non-transitory computer-readable medium also includes program code to estimate the category of the detected object in the object pose in the region of interest based on a relationship between the point representing the detected object in the object pose and a plurality of separate object clusters in the 3D manifold space. The non-transitory computer-readable medium further includes program code to supply the category of the detected object in the object pose to a planner of the autonomous vehicle vision system. The non-transitory computer-readable medium also includes program code to control operation of an autonomous vehicle according to an improved route selected by the planner based on a predicted behavior of the detected object in the object pose.

An autonomous vehicle vision system for estimating a category of a detected object in an object pose unknown to the autonomous vehicle vision system is described. The autonomous vehicle vision system includes a neural network configured to apply a mapping process to a region of interest in an image including the detected object in the object pose to obtain a point in a 3D manifold space. The autonomous vehicle vision system also includes an object detector configured to estimate the category of the detected object in the object pose in the region of interest based on a relationship between the point representing the detected object in the object pose and a plurality of separate object clusters in the 3D manifold space. The autonomous vehicle vision system further includes a planner configured to select an improved route based on a predicted behavior of the category of the detected object in the object pose. The autonomous vehicle vision system also includes a controller configured to control operation of an autonomous vehicle according to the improved route selected by the planner.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
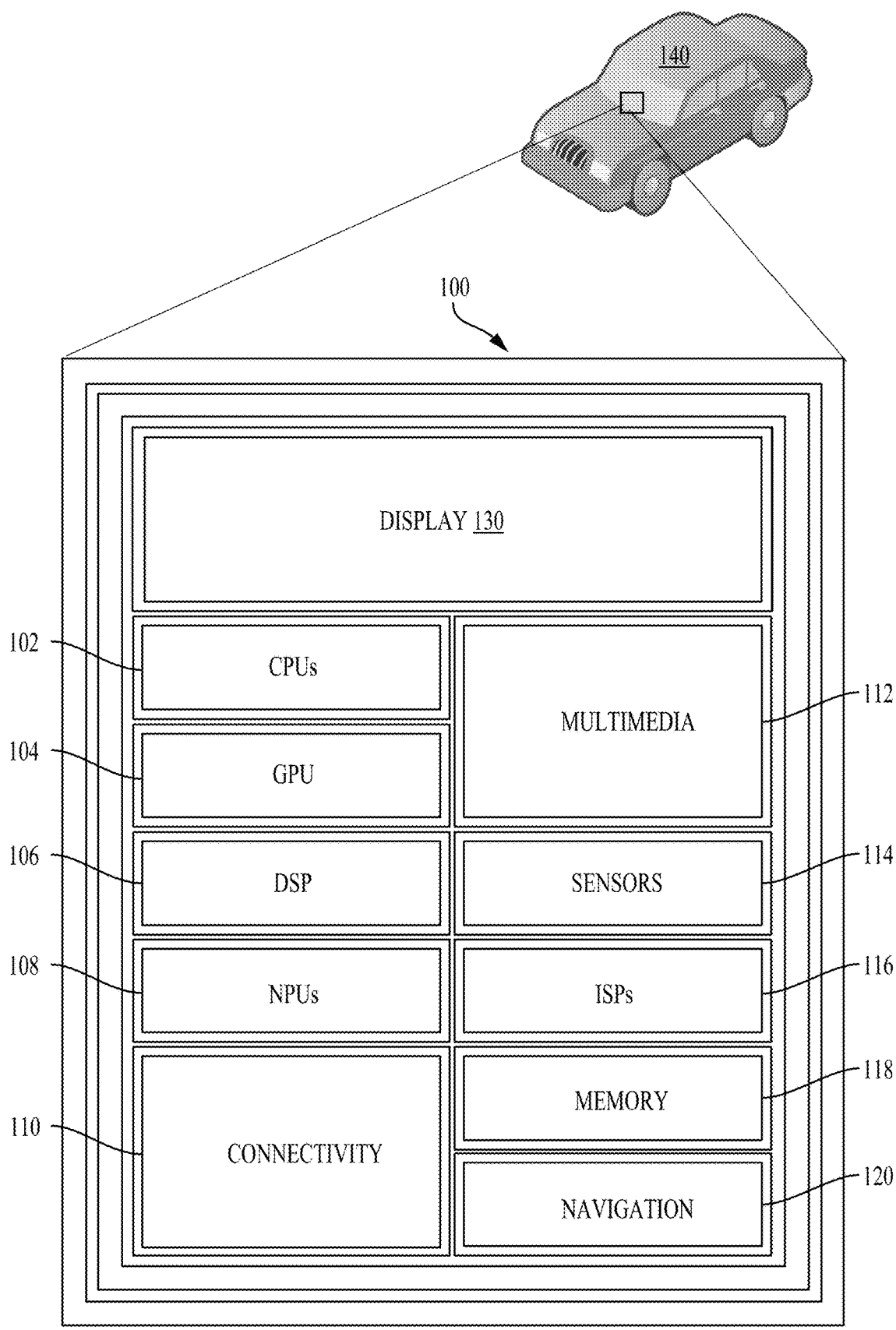
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Aspects of the present disclosure provide a novel autonomous vehicle vision system configured for detecting categories of objects and their poses for which a convolutional neural network (CNN) of the autonomous vehicle vision system may be untrained. In one configuration, the system estimates a category of an unknown object and its pose without the object having been previously known and/or trained for recognition in the autonomous vehicle vision system. In one aspect of the present disclosure, the system uses manifold learning for establishing separate object clusters for different categories of objects in an N-dimensional manifold space. In this example, objects of different categories/classes are mapped to different object clusters, and different poses of objects of the same category are mapped to different positions on their corresponding object cluster in the N-dimensional manifold space (e.g., a sixteen-dimensional (16D) manifold space). This aggregation may enable a continual viewpoint of an object from various object poses.

Manifold learning is a nonlinear dimensionality reduction technique based on the principle that although a data point may consist of thousands of features, the data point may be described as a function of a few underlying parameters. For example, data points may simply represent samples from a low-dimensional manifold embedded in a high-dimensional space. Manifold learning algorithms uncover these few underlying parameters for providing a low-dimensional representation of the data.

For example, machine learning applications may involve deriving a classifier for an extremely large dataset. Extremely large data sets, however, place a significant burden on standard machine learning algorithms. Techniques for reducing a dimensionality of the data may substantially reduce a quantity of features in the large dataset for lessening the burden on standard machine learning algorithms (e.g., classifiers and function estimators). Reducing a dimensionality of the data also enables visualization of the data, which is generally ineffective before the dimensionality of the data is reduced.

Dimensionality reduction, according to aspects of the present disclosure, assumes that the given high-dimensional data set contains related features because they are measurements of the same underlying cause. In this example, a data set involves video footage/photographs of an object from multiple angles (e.g., poses). Because the features of such a data set contain substantial overlapping information, manifold learning may be applied to yield a manifold structure of the data that is a simplified, non-overlapping representation of the data that is identifiable with the underlying parameters that govern the data.

Training of the N-dimensional manifold space and the object clusters may be performed for providing smooth representations of the object categories and corresponding poses. In aspects of the present disclosure, a smoothness of the representations of the object categories and corresponding poses enable estimating a category and a pose of similar objects that have not yet been seen by the system. By contrast, most object detectors (e.g., hard classifiers) operate on a two-dimensional (2D) space and may be able to recognize very basic views of an object (e.g., front of car, side of car, back of car, etc.). Unfortunately, this representation is very coarse and may not be sufficient for all applications because confidence factors for data classification may be insufficient.

In this aspect of the present disclosure, a manifold learning process establishes a mapping of an image to a vector that represents a point in the N-dimensional manifold space. Images of known object categories and poses are mapped to points on object clusters corresponding to their respective categories. When an unknown object is captured in an area of interest in an image, a mapping process is applied to the area of interest for obtaining a point in the N-dimensional manifold space. The relationship between the point representing the area of interest and the N-dimensional manifold space is analyzed and/or reasoned to estimate a category and pose of the object in the area of interest. As described in further detail below, this hard classification of objects and corresponding object poses is performed with enhanced confidence.

For example, known models of cars and bicycles are objects of different categories. Known models of cars and bicycles viewed from different angles correspond to different poses of cars and bicycles. In one aspect of the present disclosure, a manifold learning process is driven to increase (e.g., maximize) a separation between a car object cluster and a bicycle object cluster in the N-dimensional manifold space. In this example, the car object cluster is aggregated according to car poses, and the bicycle object cluster is aggregated according to bicycle poses. When a new model car is captured in a region of interest in an image, the region of interest is selected and mapped to a point in the N-dimensional manifold space that is in the vicinity of the car object cluster. In this example, the system may infer the category and the pose of the new model car captured in the region of interest, based on the distances among the points of the new model car and the car object cluster.

Autonomous vehicles rely on computer vision for analyzing an area of interest in an image. According to aspects of the present disclosure, a convolutional neural network is trained to provide feature vectors for enabling detection of a category and a pose of an object captured within an area of interest in an image. That is, a feature vector for the detected object may be mapped to an N-dimensional manifold space. The N-dimensional manifold space may be trained to separate objects according to object clusters that aggregate poses of objects of the same category in the corresponding object clusters. Aspects of the disclosure identify new variations of objects of a category that may not have been seen before based on a point representing the object relative to object clusters in the N-dimensional manifold space. The N-dimensional manifold space may be incorporated into a detection module of an autonomous vehicle. Object detection applications may include route planning based on detected unknown objects.

An artificial neural network, which may comprise an interconnected group of artificial neurons (e.g., neuron models), is a computational device or represents a method to be performed by a computational device. For example, convolutional neural networks are a type of feed-forward artificial neural network used in the area of object detection and classification. In particular, convolutional neural networks (CNNs) may be trained to recognize various viewpoints of a detected object in a region of interest of an image, and thus, have been used in object recognition and other classification applications. Other models are also available for object recognition and classification. For example, support vector machines (SVMs) are learning algorithms that can be applied for classification.

Aspects of the present disclosure are related to determining a mapping, such that in response to an image viewpoint, a CNN outputs a feature vector in a 3D space that retains a structure of the image viewpoint in the 3D space. An N-dimensional manifold space learns to separate clusters of different object types, while aggregating poses of similar object types within the same object cluster. This separation of different object types may be used to speed up detection/recognition (e.g., metric learning/training based on many objects of interest). During detection, an identified region of interest in an image may be mapped to a feature vector representing a point in the N-dimensional manifold space. A detected object within the region of interest may be identified as belonging to a category of an object cluster within the N-dimensional manifold that is within a predetermined threshold distance from a point representing the detected object in the N-dimensional manifold space.

FIG. 1 illustrates an example implementation of the aforementioned method of estimating a category of an unknown object and its pose without the object been previously known and/or trained for recognition in an autonomous vehicle vision system using a system-on-a-chip (SOC) 100 of a vehicle vision system of an autonomous vehicle 140. The SOC 100 may include a single processor or a multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth connectivity, and the like. In addition, a multimedia processor 112 in combination with a display 130 may, for example, classify and categorize poses of objects in an area of interest according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be server computer in communication with the autonomous vehicle 140. In this arrangement, the autonomous vehicle 140 may include a processor and other features of the SOC 100. In this aspect of the present disclosure, instructions loaded into a processor (e.g., CPU 102) or the NPU 108 of the autonomous vehicle 140 may include code for detecting a region of interest in an image captured by the sensor processor 114. The instructions loaded into a processor (e.g., CPU 102) may also include code for estimating a category of an unknown object and its pose without the object having been previously known and/or trained for recognition in an autonomous vehicle vision system. The SOC 100 may estimate a category of an object and a corresponding pose by mapping a feature vector of the object to a point on an N-dimensional manifold space and determining a distance between the point and separate object clusters in the N-dimensional manifold space.

In an aspect of the present disclosure, the instructions loaded into a processor (e.g., CPU 102) or the NPU 108 may include code for classifying and categorizing images from multiple viewpoints. For example, the instructions loaded into the CPU 102 may also include code for detecting an object and generating a feature vector for representing a 3D point of view of the object as a point in an N-dimensional manifold space (e.g., in conjunction with the DSP 106 and/or the NPU 108). The instructions loaded into the CPU 102 may further include code for improving estimation of unknown objects.

Figure 2:
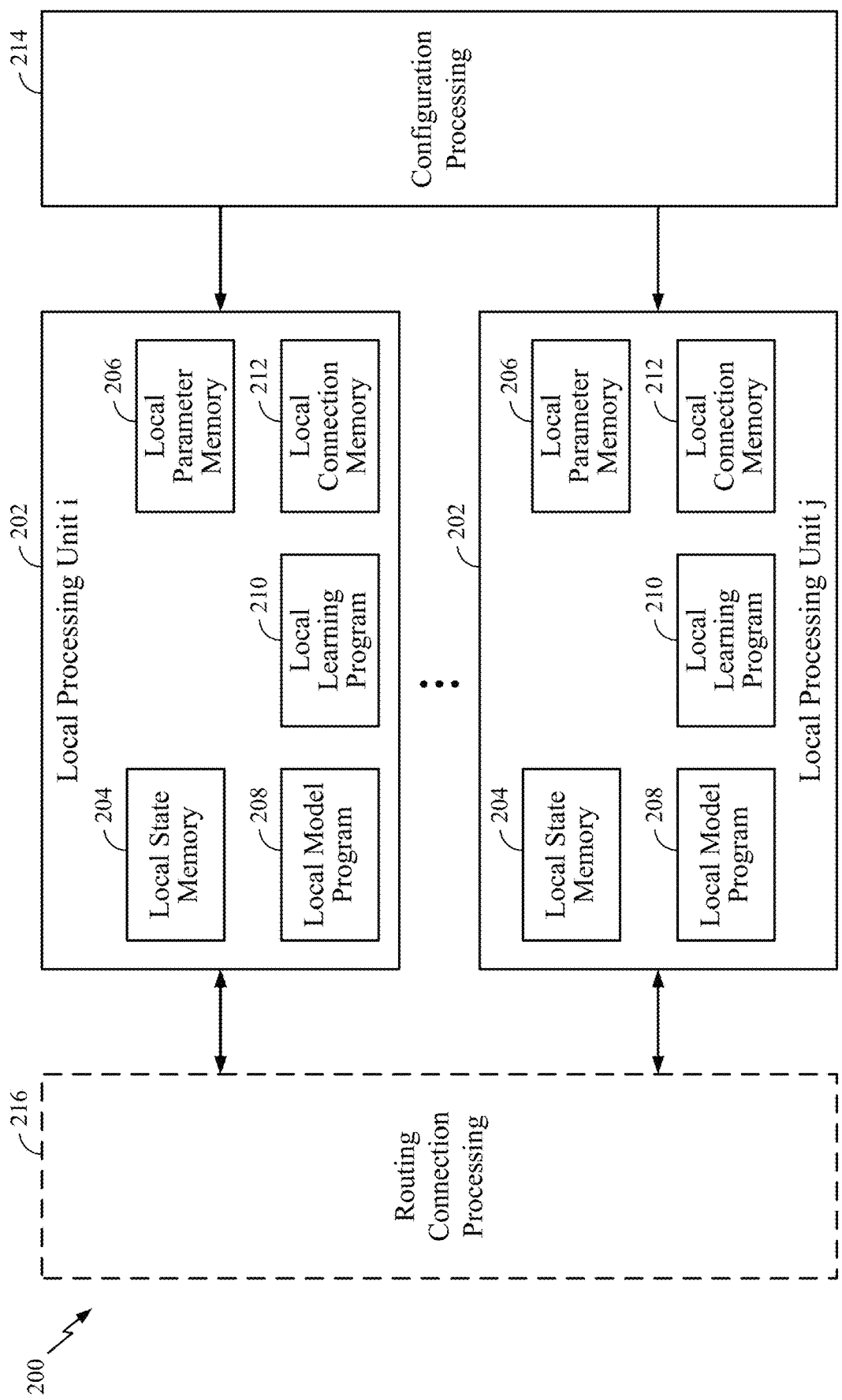
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have local processing units 202 that may perform various operations of methods described herein. Each of the local processing units 202 may comprise a local state memory 204 and a local parameter memory 206 that may store parameters of a neural network. In addition, each of the local processing units 202 may have a local (neuron) model program (LMP) memory 208 for storing a local model program, a local learning program (LLP) memory 210 for storing a local learning program, and a local connection memory 212. Furthermore, as illustrated in FIG. 2, each of the local processing units 202 may interface with a configuration processing unit 214 for providing configurations for local memories of the local processing unit, and with a routing connection processing unit 216 that provides routing between the local processing units 202.

Deep learning architectures may perform a pattern recognition task by learning to represent inputs at successively higher levels of abstraction in each layer, thereby building up a useful feature representation of the input data. In this way, deep learning may address a major bottleneck of traditional machine learning. Prior to the advent of deep learning, a machine learning approach to a pattern recognition problem may have relied heavily on human engineered features in combination with a shallow classifier. A shallow classifier may be a two-class linear classifier, for example, in which a weighted sum of the feature vector components may be compared with a threshold to predict a classification for the input. Human engineered features may be templates or kernels tailored to a specific problem domain by engineers with domain expertise. Deep learning architectures, in contrast, may learn to represent patterns through training. Furthermore, a deep learning network may learn to represent and recognize new types of patterns that a human may not have considered.

A convolutional neural network (CNN) may be trained with supervised learning. During training, a CNN may be presented with various viewpoints of various object categories. The network designer may want the CNN to output an estimate of an unknown object and corresponding pose with a high degree of confidence. Before training, the output produced by the CNN is likely to be incorrect, and so an error may be calculated between the actual output and the target output. The weights of the CNN may then be adjusted so that the output scores of the CNN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the CNN may be presented with unknown objects and poses. A forward pass through the network may yield an output that may be considered an inference or a prediction of the CNN for identifying an object that was previously unknown by an autonomous vehicle vision system.

Figure 3:
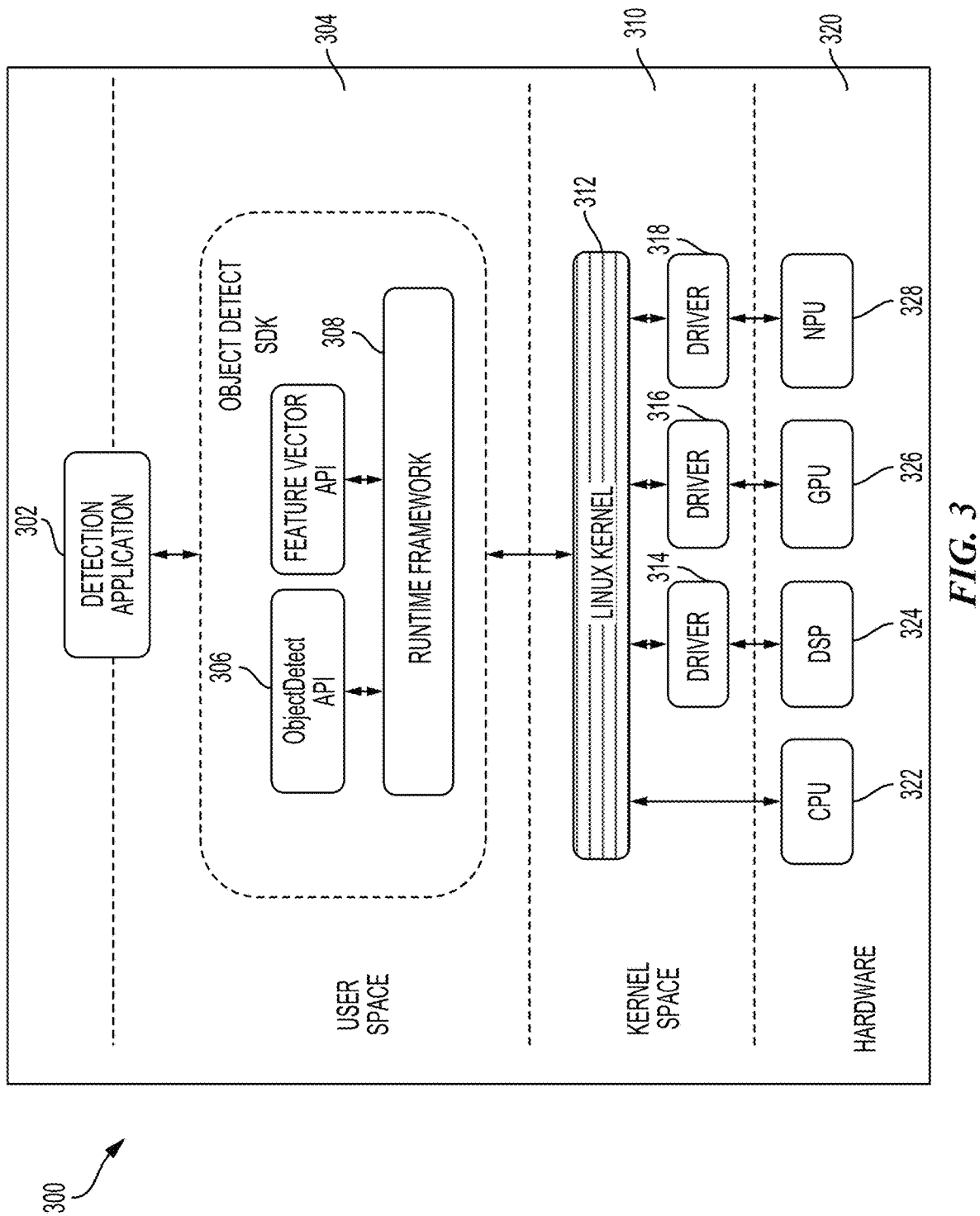
FIG. 3 is a block diagram illustrating an exemplary software architecture that may modularize artificial intelligence (AI) functions for estimating a category of an unknown object and a corresponding pose of the unknown object, according to aspects of the present disclosure.

FIG. 3 is a block diagram illustrating an exemplary software architecture 300 that may modularize artificial intelligence (AI) functions for estimating a category of an unknown object and a corresponding pose of the unknown object, according to aspects of the present disclosure. Using the architecture, a detection application 302 may be designed such that it may cause various processing blocks of an SOC 320 (for example a CPU 322, a DSP 324, a GPU 326 and/or an NPU 328) to perform supporting computations during run-time operation of the detection application 302.

The detection application 302 may be configured to call functions defined in a user space 304 that may, for example, provide for computing a feature vector for representing a 3D point of view of an object as a point in an N-dimensional manifold space in which object clusters are separated by a predetermined distance. The detection application 302 may make a request to compiled program code associated with a library defined in an ObjectDetect application programming interface (API) 306 to provide an estimate of an object category and corresponding pose of a previously known object. This request may ultimately rely on the output of a convolutional neural network configured to provide the feature vector for representing a 3D point of view of an object as a point in the N-dimensional manifold space.

A run-time engine 308, which may be compiled code of a runtime framework, may be further accessible to the detection application 302. The detection application 302 may cause the run-time engine 308, for example, to map the feature vector of an unknown object to a point in the N-dimensional manifold space. When the point in the N-dimensional manifold space is within a predetermined distance of an object cluster in the N-dimensional manifold space, the run-time engine 308 may in turn send a signal to an operating system 310, such as a Linux Kernel 312, running on the SOC 320. The operating system 310, in turn, may cause a computation to be performed on the CPU 322, the DSP 324, the GPU 326, the NPU 328, or some combination thereof. The CPU 322 may be accessed directly by the operating system 310, and other processing blocks may be accessed through a driver, such as drivers 314-318 for the DSP 324, for the GPU 326, or for the NPU 328. In the exemplary example, the deep neural network may be configured to run on a combination of processing blocks, such as the CPU 322 and the GPU 326, or may be run on the NPU 328, if present.

Autonomous vehicles rely on computer vision for analyzing an area of interest in an image. According to aspects of the present disclosure, a convolutional neural network is trained to provide feature vectors for enabling detection of a category and a pose of an object captured within an area of interest in an image. That is, a feature vector for a detected object may be mapped to an N-dimensional manifold space. The N-dimensional manifold space may be trained to separate objects according to object clusters that aggregate poses of objects of the same category in the corresponding object clusters. Aggregating poses of objects of the same category improves a continual point of view of the object category and the object pose of separate object clusters in the N-dimensional manifold space. Aspects of the disclosure identify new variations of objects of a category that may not have been seen before based on a point representing the object relative to object clusters in the N-dimensional manifold space. The N-dimensional manifold space may be incorporated into a detection module of an autonomous vehicle, for example, as shown in FIG. 4.

Figure 4:
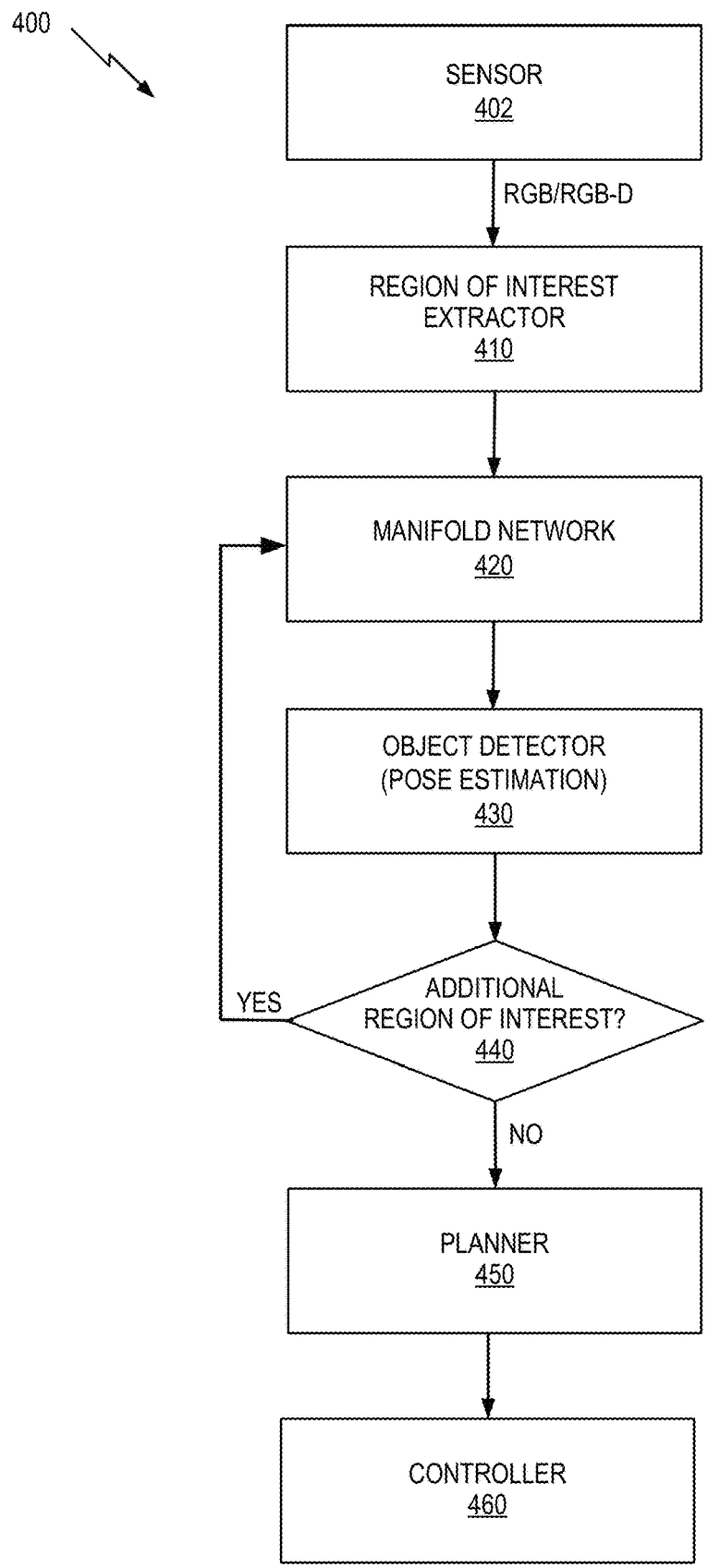
FIG. 4 is a block diagram illustrating a detection framework of an autonomous vehicle vision system for estimating a category and a pose of an unknown object, according to aspects of the present disclosure.

FIG. 4 is a block diagram illustrating a detection framework of an autonomous vehicle vision system for estimating a category and a pose of an unknown object according to aspects of the present disclosure. Representatively, a detection framework 400 includes a sensor 402, which may include multiple sensors for analyzing a 3D area surrounding a vehicle. Images captured by the sensor 402 may be provided as red-green-blue (RGB) data (or RGB and depth (RGB-D) data). In this configuration, a region of interest extractor 410 identifies a region of interest in the image as well as one or more detected objects within the region of interest. This detected region of interest and corresponding detected objects are provided to a manifold network 420.

In this aspect of the present disclosure, an object detector 430 in conjunction with the manifold network 420 are configured to identify unknown objects and their corresponding poses. This identification process may be performed according to a proximity of a point representation of the unknown object and an object cluster in an N-dimensional manifold space of the manifold network. This process may be repeated for each region of interest in an image, as noted at block 440. In this aspect of the present disclosure, a convolutional neural network of the manifold network 420 is configured to generate a 3D feature vector that retains a structure of a 3D view space of an anomalous object. The convolutional network is trained to generate feature vectors with sufficient information to distinguish/identify an anomalous object and the pose of the anomalous object when represented as a point in the N-dimensional manifold space of the manifold network.

Figure 5:
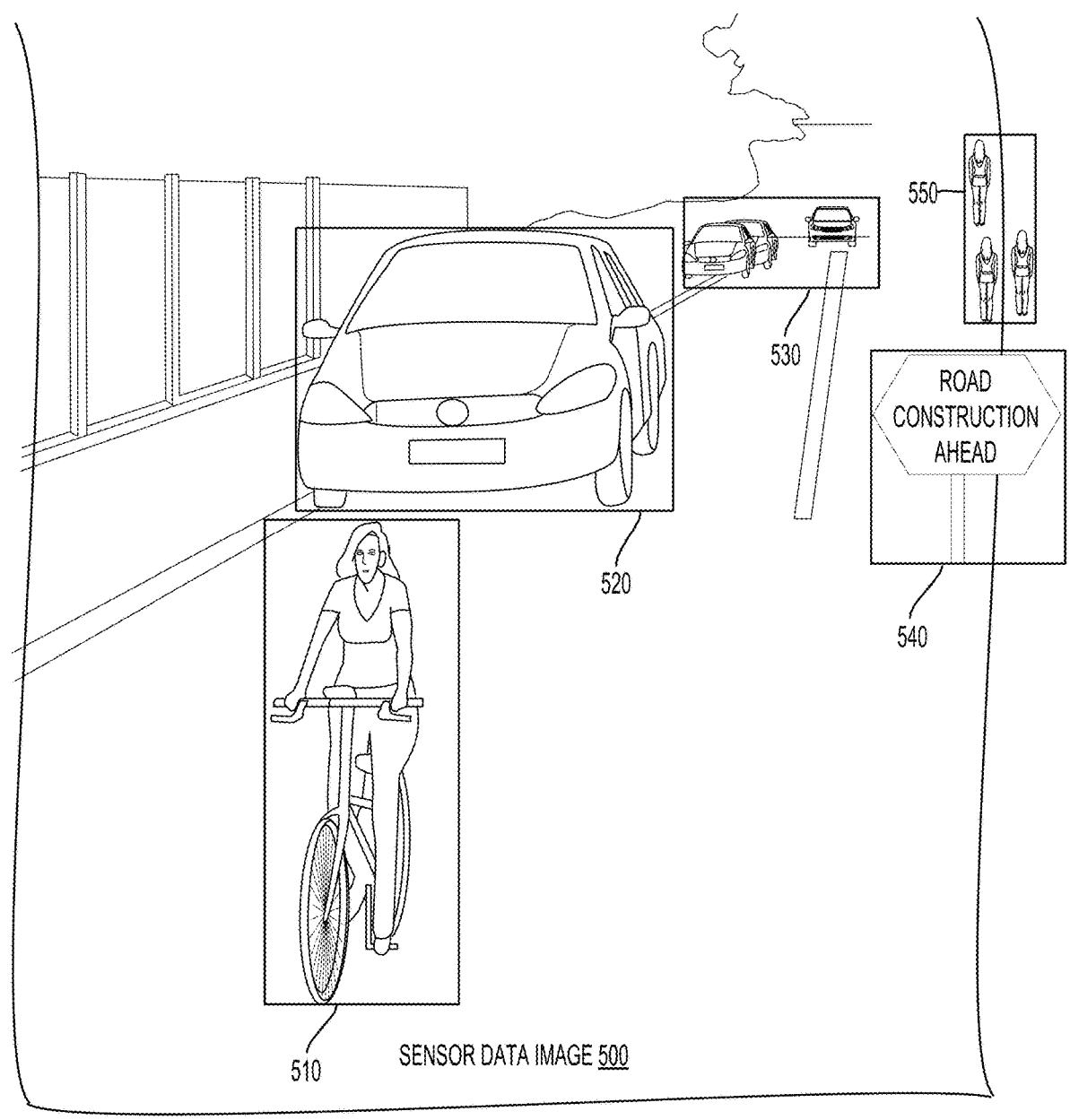
FIG. 5 illustrates a sensor data image captured by a vehicle according to aspects of the present disclosure.
Figure 6:
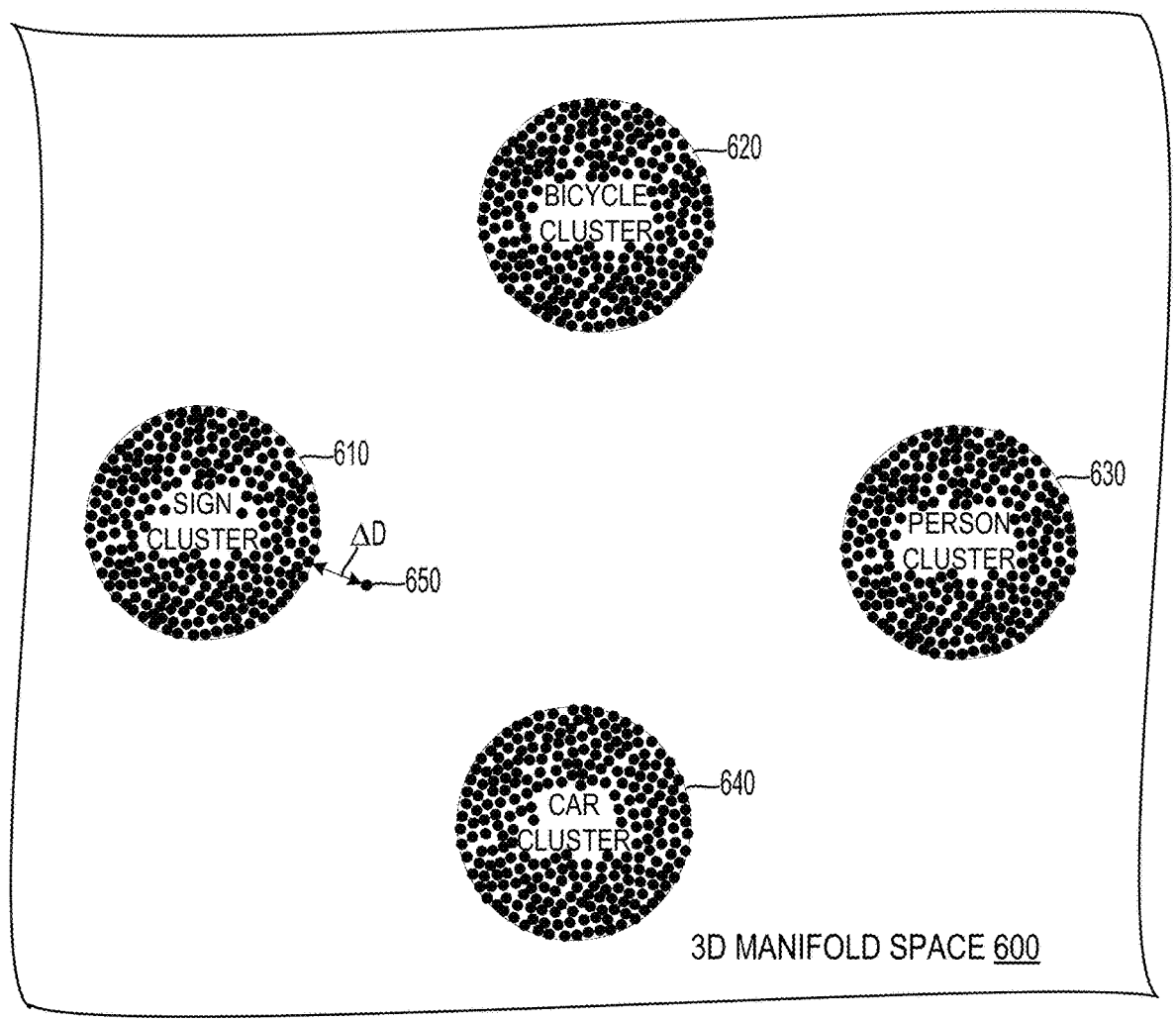
FIG. 6 illustrates a 3D manifold space configured to separately define object clusters with aggregated object poses, in which the object clusters are separated by a predetermined distance, according to aspects of the present disclosure.

According to aspects of the present disclosure, the manifold network 420 may be configured according to an N-dimensional manifold space. Training of a 3D manifold space may be performed according to sensor data image 500 (FIG. 5) and a 3D manifold space 600 (FIG. 6). Although FIGS. 5 and 6 are described with reference to a 3D manifold space, it should be recognized that aspects of the present disclosure contemplate an N-dimensional manifold space. In particular, while a 3D manifold allows for easy visualization/plotting, a manifold space is usually larger (e.g. 16 dimensions), which may be determined though experimentation.

Once processed, the identified objects and their corresponding poses are provided to a planner 450 that is responsible for controlling an autonomous vehicle system through a controller 460. That is, the detection framework 400 works with the planner 450 and the controller 460, which are configured to perform route planning vehicle control based on predicted behavior of detected known/unknown objects of, for example, the autonomous vehicle 140. The object identification process performed by the object detector 430 to identify an object and estimate an object pose in conjunction with the manifold network 420 may significantly improve a confidence associated with identifying unknown objects and their corresponding poses.

A sample confidence value can be based on a diameter of the object category's (e.g., hypersphere) in the manifold network 420 (e.g., the 3D manifold space 600 shown in FIG. 6). If, for example, all the manifold points for a category are maximally apart by diameter 'd', then we classify an unknown object having a manifold feature F as belong to this category if it is closer than 2*d. We can also find the values through experimentation by using a hitherto withheld dataset. Experimentation may also be used to determine where the objects land in the manifold space for determine a threshold value that gives the best separation for all examples. For the pose, we identify the closest point to the manifold feature F from this category and assume the same pose for the unknown object, or find the closest N points and interpolate their poses to compute the pose for the unknown object.

The improved confidence results in an improved route selected by the planner 450 based on a predicted behavior (e.g., predicted action or trajectory). The controller 460 is configured to control a behavior of an autonomous vehicle (e.g., 140) according to the improved route selected by the planner 450 based on the predicted behavior of the detected object in the object pose.

FIG. 5 illustrates a sensor data image captured by a vehicle according to aspects of the present disclosure. In this example, a sensor data image 500 includes various regions of interest within a scene illustrating, for example, an environment including on-coming traffic sensed by a vehicle. Representatively, a first region of interest 510 may include a bicycle rider. A second region of interest 520 includes a vehicle following the bicycle rider in the first region of interest 510. A third region of interest 530 includes further on-coming vehicles. The sensor data image 500 further includes a fourth region of interest 540 including a road construction sign and a fifth region of interest 550 including road workers.

FIG. 6 illustrates a 3D manifold space 600 configured to separately define object clusters with aggregated object poses, in which the object clusters are separated by a predetermined distance, according to aspects of the present disclosure. In this configuration, the 3D manifold space 600 includes a sign object cluster 610, a bicycle object cluster 620, a person object cluster 630, and a car object cluster 640. It should be recognized that fewer or additional object clusters may be included in the 3D manifold space 600. In this example, training of the 3D manifold space is performed using various object images taken from various 3D viewpoints of the various objects. In this aspect of the present disclosure, manifold learning produces smooth (e.g., mathematically continuous and differentiable) representations of the object categories and corresponding poses.

In aspects of the present disclosure, manifold learning produces mathematically smooth representation spaces of the object categories and corresponding poses, which enables estimating a category and a pose of similar objects that have not yet been seen by the system. By contrast, most object detectors (e.g., hard classifiers) operate in a 2D space and may be able to recognize very basic views of an object (e.g., front of car, side of car, back of car, etc.). Unfortunately, this representation is very coarse and may not be sufficient for many applications because confidence factors for data classification may be insufficient.

In this aspect of the present disclosure, a manifold learning process establishes a mapping of an object image to a feature vector that represents a point in the 3D manifold space. Images of known object categories and poses are mapped to points on object clusters corresponding to their respective categories. For example, the 3D manifold space 600 is trained with various viewpoints of traffic signs to form the sign object cluster 610, which may be a 3D clustering of points representing the various traffic signs and different poses of the traffic signs. The bicycle object cluster 620, the person object cluster 630, and the car object cluster 640 may be formed using a similar process.

For example, known models of cars and bicycles are objects of different categories. Known models of cars and bicycles viewed from different angles correspond to different poses of cars and bicycles. In one aspect of the present disclosure, a manifold learning process is driven to increase (e.g., maximize) a separation between the car object cluster 640 and the bicycle object cluster 620 in the 3D manifold space. In this example, the car object cluster 640 is aggregated according to car poses, and the bicycle object cluster 620 is aggregated according to bicycle poses. For example, a new model car may be captured in the first region of interest 510 in sensor data image 500. The feature vector of a new car model in the second region of interest 520 should map to a point in the 3D manifold space 600 that is in the vicinity of the car object cluster 640. In this example, the system may infer the category and the pose of the new model car captured in the second region of interest 520, based on the distance between the point representing the new model car and the car object cluster 640.

FIG. 6 further illustrates an unknown object point 650 in the 3D manifold space 600. For example, as shown in FIG. 5, the road construction sign in the fourth region of interest 540 may represent an unknown object. In response to the unknown object captured in the fourth region of interest 540 of the sensor data image 500, a mapping process is applied to the unknown object for obtaining the unknown object point 650 in the 3D manifold space 600. The relationship between the point representing the unknown object and the 3D manifold space 600 is analyzed and/or reasoned to estimate a category and pose of the unknown object in the fourth region of interest 540. In this example, a proximity (ΔD) between the unknown object point 650 and the sign object cluster 610 enables identification of the unknown object as a road construction warning sign. In this aspect of the present disclosure, hard classification of objects and corresponding object poses is performed with enhanced confidence according to an object cluster proximity.

In FIG. 4, the object detector 430 in conjunction with the manifold network 420 are configured to identify unknown objects and their corresponding poses according to a proximity of a point representation of the object and an object cluster. This process may be repeated for each region of interest in the sensor data image 500 shown in FIG. 5. In this aspect of the present disclosure, a convolutional neural network of the manifold network 420 is trained to generate a 3D feature vector that retains a structure of a 3D view space of an anomalous object. The convolutional network is trained to generate feature vectors with sufficient information to distinguish/identify an anomalous object and the pose of the anomalous object when represented as a point in the 3D manifold space 600.

Figure 7:
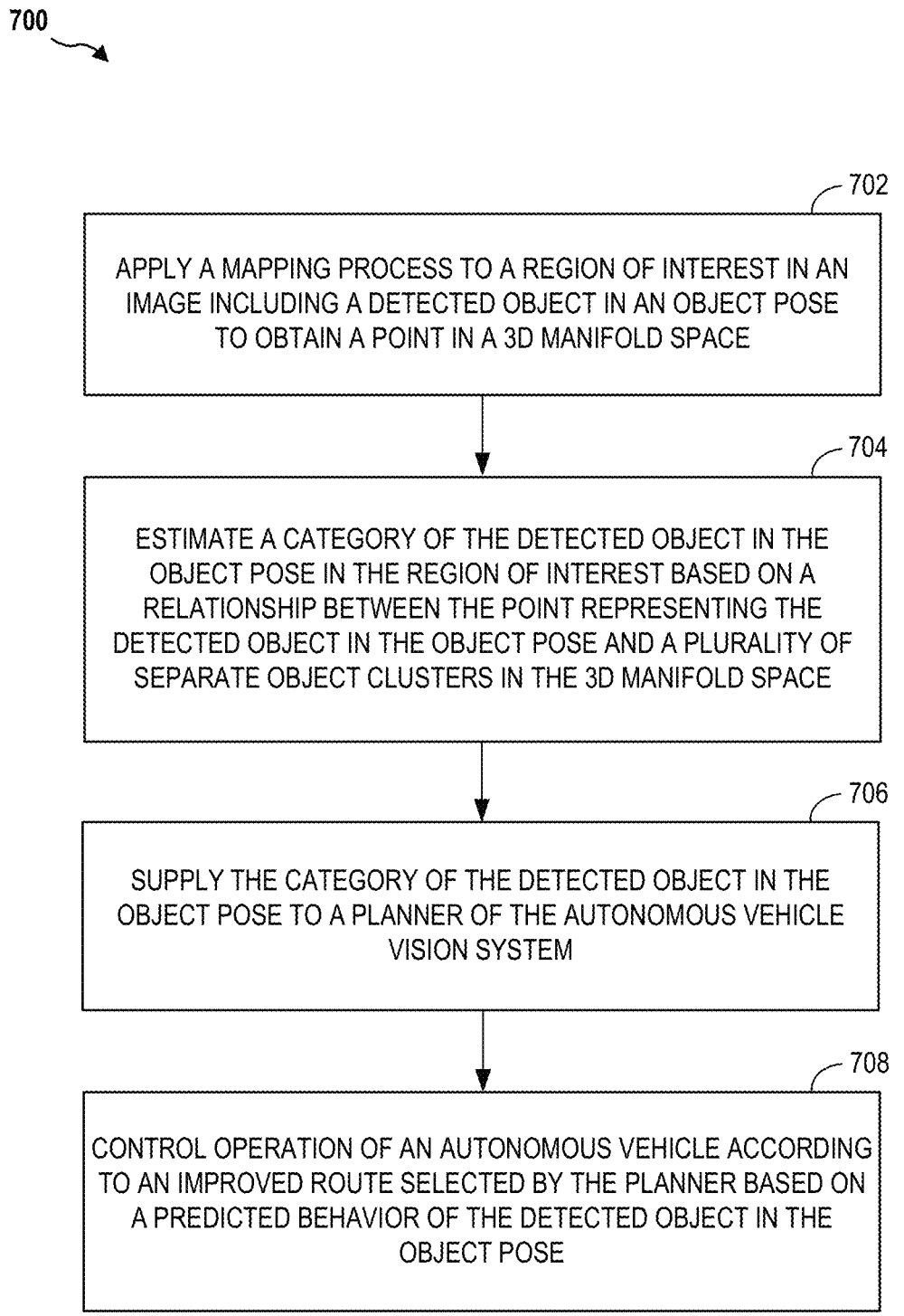
FIG. 7 illustrates a method for estimating a category of a detected object in an object pose unknown to an autonomous vehicle vision system in accordance with aspects of the present disclosure.

FIG. 7 illustrates a method for estimating a category of a detected object in an object pose unknown to an autonomous vehicle vision system in accordance with aspects of the present disclosure. A method 700 begins in block 702, in which a mapping process is applied to a region of interest in an image including a detected object in an object pose to obtain a point in a 3D manifold space. For example, as shown in FIGS. 5 and 6, a mapping process is applied to the road construction sign in the fourth region of interest 540 to obtain the unknown object point 650 in the 3D manifold space 600. In block 704, a category of the detected object in the object pose in the region of interest is estimated based on a relationship between the point representing the detected object in the object pose and a plurality of separate object clusters in the 3D manifold space. For example, as shown in FIG. 6, the unknown object point 650 is closest to the sign object cluster 610. If a distance (ΔD) between the unknown object point 650 is within a predetermined threshold, a category of the detected object in the object pose is estimated to be a sign due to the proximity to the sign object cluster 610.

Referring again to FIG. 7, in block 706, the category of the detected object in the object pose is supplied to a planner of the autonomous vehicle vision system. For example, as shown in FIG. 4, an estimated category of each detected object in a region of interest in an image is provided to the planner 450. The planner 450 may be configured to plan a route of the autonomous vehicle 140 based on the various categories of objects detected from, for example, the sensor data image 500.

Referring again to FIG. 7, in block 708, operation (e.g., a behavior) of an autonomous vehicle is controlled according to an improved route selected by the planner based on a predicted behavior of the detected object in the object pose. For example, as shown in FIG. 4, operation of an autonomous vehicle (e.g., 140) is controlled or adjusted by the controller 460 based on predicted actions (e.g., behaviors) of surrounding agents, such as vehicles and pedestrians. For example, the planner 450 may plan a route for an autonomous vehicle based on the predicted actions of surrounding agents. In addition, a route may be adjusted by the controller 460 to avoid a collision based on the predicted actions of surrounding agents. The method 700 may also include notifying the planner of an unidentified object when the distance between the position of the point and the positions of each of the separate object clusters is greater than the predetermined threshold distance. This may be performed by computing a range between the position of the point and the positions of the separate object clusters.

Autonomous vehicles rely on computer vision for analyzing an area of interest in an image. According to aspects of the present disclosure, a convolutional neural network is trained to provide feature vectors for enabling detecting of a category and a pose of an object captured within an area of interest in an image. That is, a feature vector for the detected object may be mapped to an N-dimensional manifold space. The N-dimensional manifold space may be trained to separate objects according to object clusters that aggregate poses of objects of the same category in the corresponding object clusters. Aspects of the disclosure identify new variations of objects of a category that may not have been seen before based on a point representing the object relative to object clusters in the N-dimensional manifold space. The N-dimensional manifold space may be incorporated into a detection module of as an autonomous vehicle. Object detection applications may include route planning based on detected unknown objects.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. Examples of processors that may be specially configured according to the disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a non-transitory computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for estimating a category of a detected object in an object pose unknown to an autonomous vehicle vision system, comprising:
    applying a mapping process to a region of interest in an image including the detected object in the object pose to obtain a point in a 3D manifold space;
    estimating the category of the detected object in the object pose in the region of interest based on a relationship between the point representing the detected object in the object pose and a plurality of separate 3D object clusters in the 3D manifold space by:
        analyzing a position of the point relative to the positions of the plurality of separate 3D object clusters in the 3D manifold space, and
        identifying the category of the detected object in the object pose as the category of one of the plurality of separate 3D object clusters when the position of the point is within a predetermined threshold distance of the position of the one of the plurality of separate 3D object clusters;
    supplying the category of the detected object in the object pose to a planner of the autonomous vehicle vision system; and
    controlling operation of an autonomous vehicle according to an improved route selected by the planner based on a predicted behavior of the detected object in the object pose.

2. The method of claim 1, in which applying the mapping process comprises:
    receiving the image having the region of interest including the detected object in the object pose from one or more sensors of the autonomous vehicle vision system;
    generating a feature vector to represent a 3D view space of the detected object with information to identify the detected object in the object pose; and
    mapping the feature vector representing the detected object in the object pose to the point in the 3D manifold space, in which the point is not on any of the plurality of separate 3D object clusters in the 3D manifold space.

3. The method of claim 1, further comprising:
    training the 3D manifold space to separately map objects of different categories into the plurality of separate 3D object clusters separated by at least a predetermined distance in the 3D manifold space; and aggregating each of the plurality of separate 3D object clusters according to poses of an object represented by the respective, separate 3D object clusters.

4. The method of claim 1, in which aggregating comprises improving a continual point of view of the object category and the object pose of each of the plurality of separate 3D object clusters in the 3D manifold space.

5. The method of claim 1, in which applying the mapping process comprises:

training a convolutional neural network to map the region of interest in the image including the detected object in the object pose to obtain the point in the 3D manifold space.

6. The method of claim 1, in which estimating the category of the detected object comprises:

determining a position of the point relative to the positions of the plurality of separate 3D object clusters in the 3D manifold space;

computing a range between the position of the point and the positions of the plurality of separate 3D object clusters;

detecting an object cluster within a predetermined threshold distance from the position of the point representing the detected object in the object pose; and assigning the category of the detected object cluster as the category of the detected object in the object pose.

7. The method of claim 6, further comprising:

notifying the planner of an unidentified object when a distance between the position of the point and the positions of each of the plurality of separate 3D object clusters is greater than the predetermined threshold distance.

8. The method of claim 1, further comprising:

detecting the object in the object pose in the region of interest in the image; and porting a 3D viewpoint of the detected object in the object pose to the point in the 3D manifold space.

9. A non-transitory computer-readable medium having program code recorded thereon for estimating a category of a detected object in an object pose unknown to an autonomous vehicle vision system, the program code being executed by a processor and comprising:

program code to apply a mapping process to a region of interest in an image including the detected object in the object pose to obtain a point in a 3D manifold space;

program code to estimate the category of the detected object in the object pose in the region of interest based on a relationship between the point representing the detected object in the object pose and a plurality of separate 3D object clusters in the 3D manifold space by:

program code to analyze a position of the point relative to the positions of the plurality of separate 3D object clusters in the 3D manifold space, and program code to identify the category of the detected object in the object pose as the category of one of the plurality of separate 3D object clusters when the position of the point is within a predetermined threshold distance of the position of the one of the plurality of separate 3D object clusters;

program code to supply the category of the detected object in the object pose to a planner of the autonomous vehicle vision system; and program code to control operation of an autonomous vehicle according to an improved route selected by the planner based on a predicted behavior of the detected object in the object pose.

10. The non-transitory computer-readable medium of claim 9, in which program code to apply the mapping process comprises:

program code to receive the image having the region of interest including the detected object in the object pose from one or more sensors of the autonomous vehicle vision system;

program code to generate a feature vector to represent a 3D view space of the detected object with information to identify the detected object in the object pose; and program code to map the feature vector representing the detected object in the object pose to the point in the 3D manifold space, in which the point is not on any of the plurality of separate 3D object clusters in the 3D manifold space.

11. The non-transitory computer-readable medium of claim 9, further comprising:

program code to train the 3D manifold space to separately map objects of different categories into the plurality of separate 3D object clusters separated by at least a predetermined distance in the 3D manifold space; and program code to aggregate each of the plurality of separate 3D object clusters according to poses of an object represented by the respective, separate 3D object clusters.

12. The non-transitory computer-readable medium of claim 9, in which program code to aggregate further comprises:

program code to improve a continual point of view of the object category and the object pose of each of the plurality of separate 3D object clusters in the 3D manifold space.

13. The non-transitory computer-readable medium of claim 9, in which program code to apply the mapping process further comprises:

program code to train a convolutional neural network to map the region of interest in the image including the detected object in the object pose to obtain the point in the 3D manifold space.

14. The non-transitory computer-readable medium of claim 9, in which program code to estimate the category of the detected object further comprises:

program code to determine a position of the point relative to the positions of the plurality of separate 3D object clusters in the 3D manifold space;

program code to compute a range between the position of the point and the positions of the plurality of separate 3D object clusters;

program code to detect an object cluster within a predetermined threshold distance from the position of the point representing the detected object in the object pose; and program code to assign the category of the detected object cluster as the category of the detected object in the object pose.

15. An autonomous vehicle vision system for estimating a category of a detected object in an object pose unknown to the system, comprising:

a neural network configured to apply a mapping process to a region of interest in an image including the detected object in the object pose to obtain a point in a 3D manifold space;

an object detector configured to estimate the category of the detected object in the object pose in the region of interest based on a relationship between the point representing the detected object in the object pose and a plurality of separate 3D object clusters in the 3D manifold space by:

analyzing a position of the point relative to the positions of the plurality of separate 3D object clusters in the 3D manifold space, and identifying the category of the detected object in the object pose as the category of one of the plurality of separate 3D object clusters when the position of the point is within a predetermined threshold distance of the position of the one of the plurality of separate 3D object clusters;

a planner configured to select an improved route based on a predicted behavior of the category of the detected object in the object pose; and a controller configured to control operation of an autonomous vehicle according to the improved route selected by the planner.

16. The autonomous vehicle vision system of claim 15, in which the planner is further configured to select the improved route for the autonomous vehicle based on predicted actions of detected surrounding agents in poses unknown to the autonomous vehicle vision system.

17. The autonomous vehicle vision system of claim 15, in which the object detector is further configured to notify the planner of an unidentified object when a distance between a position of the point and the positions of each of the plurality of separate 3D object clusters in the 3D manifold space is greater than the predetermined distance.

18. The autonomous vehicle vision system of claim 15, in which the neural network is trained to map the region of interest in the image including the detected object in the object pose to obtain the point in the 3D manifold space.

\* \* \* \* \*